(No Model.)
E. G. LANTZ.
SYRUP PITCHER.
No. 594,629.  Patented Nov. 30, 1897.
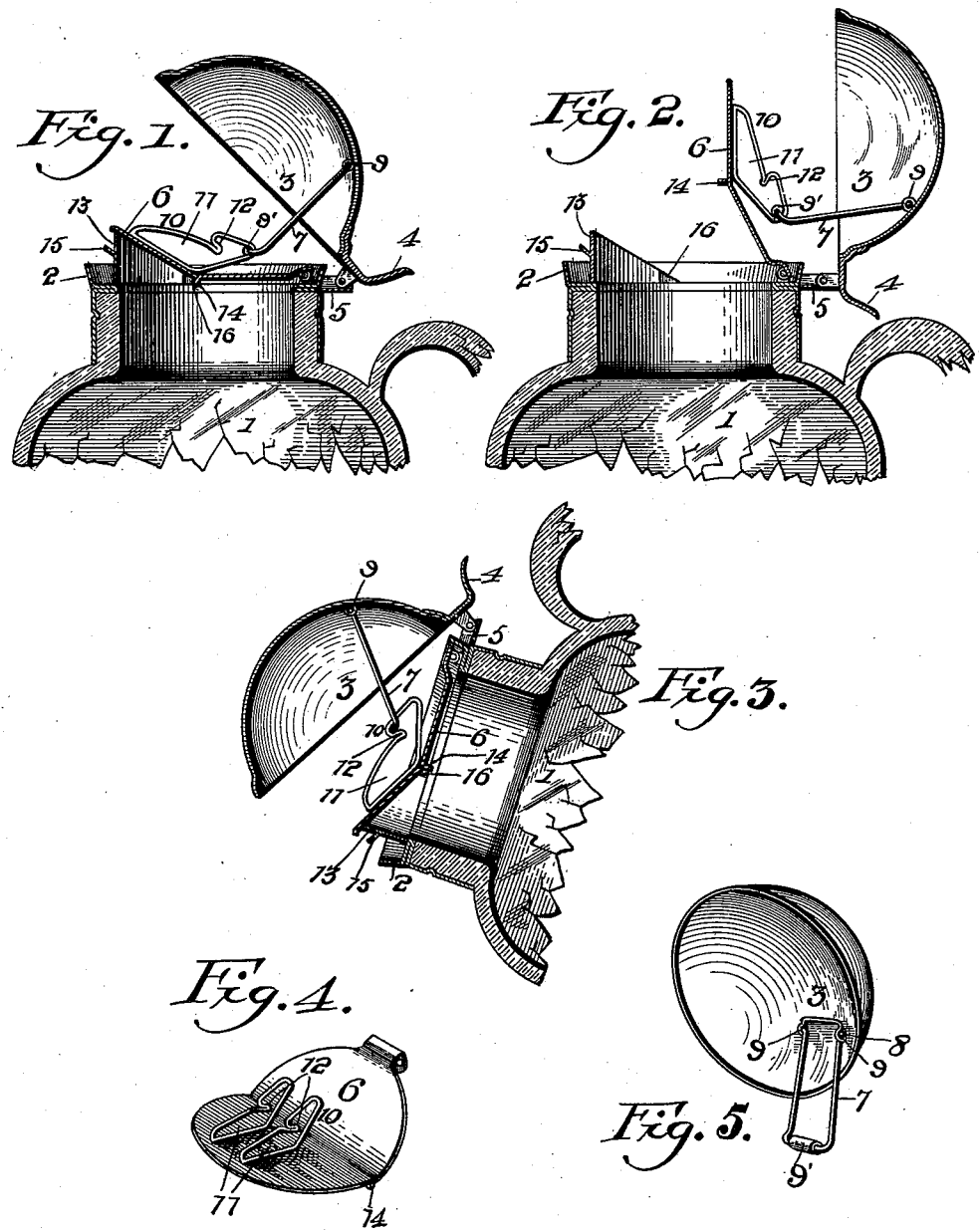

UNITED STATES PATENT OFFICE.

ELMER G. LANTZ, OF ALBANY, OREGON.

SYRUP-PITCHER.

SPECIFICATION forming part of Letters Patent No. 594,629, dated November 30, 1897.

Application filed June 25, 1897. Serial No. 642,314. (No model.)

*To all whom it may concern:*

Be it known that I, ELMER G. LANTZ, a citizen of the United States, residing at Albany, in the county of Linn and State of Oregon, have invented a new and useful Syrup-Pitcher, of which the following is a specification.

The invention relates to improvements in syrup-pitchers.

The object of the present invention is to improve the construction of syrup-pitchers and to provide a simple and efficient one capable of enabling the flow of the syrup to be controlled and cut off on the inside, in order to maintain the exterior perfectly clean and free of syrup.

A further object of the invention is to improve that class of syrup-pitchers which are provided with inner and outer lids and to provide simple and efficient means for raising the outside lid before the inner one starts to open, and also for closing the inner lid and cutting off the flow of liquid before the outer lid closes.

The invention consists in the construction and novel combination and arrangement of parts, as hereinafter fully described, illustrated in the accompanying drawings, and pointed out in the claims hereto appended.

In the drawings, Figure 1 is a vertical sectional view of a syrup-pitcher constructed in accordance with this invention, the outer lid being partially open. Fig. 2 is a similar view of the upper portion of the pitcher, the inner and outer lids being open. Fig. 3 is a similar view, the pitcher being in an inclined position and the weighted link of the outer lid being in engagement with the notches or shoulders of the guide of the inner lid. Fig. 4 is a detail perspective view of the inner lid, showing the guide thereof. Fig. 5 is a similar view of the outer lid, showing the weighted link.

Like numerals of reference designate corresponding parts in the several figures of the drawings.

1 designates a syrup-pitcher provided at its top with a neck and having an annular flange 2 at the upper edge thereof, over which closes an outer lid 3, and the latter, which is provided with a thumb-piece 4, is pivoted at opposite sides thereof to an extension 5 of the neck of the pitcher. The thumb-piece, which is located adjacent to the handle of the pitcher, is adapted to be depressed in the usual manner to raise the outer lid, and the latter is adapted to close by gravity.

The outer lid 3 is connected with an inner hinged lid 6 by a swinging link 7, which is substantially U-shaped and which has the upper terminals of its sides bent outward at right angles to form pintles 8 and engage with suitable eyes 9 of the outer lid. The link, which is provided at its lower end with a weight 9, engages a guide 10, which consists of a pair of parallel loops 11, constructed of wire or other suitable material and soldered or otherwise secured to the upper face of the inner hinged lid 6. The loops of the guide are oblong, and their lower sides are slightly V-shaped, as shown. The transverse bottom portion of the link passes through the parallel loops and is adapted, when the outer lid is raised, to slide longitudinally of the guide and engage the rear or inner end thereof. This loose connection between the inner and outer lids permits the outer one to open a considerable distance before the inner one starts, as clearly illustrated in Fig. 1 of the accompanying drawings. The outer lid is then opened farther to the position shown in Fig. 2, whereby the inner lid is also opened.

When the pitcher is in an inclined position in pouring out syrup, as illustrated in Fig. 3 of the accompanying drawings, the weighted lower end of the link swings outward or forward into engagement with shoulders 12 of the upper sides of the guides, and the outer lid is adapted to press the inner lid firmly against a lip 13 to cut off the flow of syrup. When the pitcher is raised to an upright position, the lower end of the link will automatically drop out of engagement with the shoulders of the guides, and the outer lid may then be completely closed.

The inner lid is hinged at its inner or rear edge and is provided with a central depending flange 14. The lip is provided with a curved flange 15, arranged a short distance below the upper edge thereof and adapted to collect any drippings and conduct them back into the pitcher, openings 16 being provided at the ends of the lip for the return of the syrup. The shoulders 12 of the guide are formed by bending the upper sides of the loops in the manner shown, and the inner lid, which is transversely bent near its center, has the inner or rear portion arranged above the upper edges of the neck of the pitcher.

The advantages of the invention are as follows: The syrup-pitcher is simple and comparatively inexpensive in construction. It is easily operated, and it is adapted to control the flow of syrup and prevent the same from accumulating on its exterior. The outer lid opens partially before the inner lid starts to open, and the flow of syrup is absolutely cut off before the outer lid closes. The swinging link is automatic in its operation and is in position to engage the shoulders of the loops when the pitcher is inclined, and it automatically drops out of such engagement when the pitcher is brought to an upright position.

What I claim is—

1. The combination with a syrup-pitcher provided with inner and outer lids, of a guide mounted on the inner lid and provided with a shoulder, and a link carried by the outer lid and engaging said guide, whereby the two lids are loosely connected, said link being adapted to engage the shoulder of the guide to close the inner lid and cut off the flow of liquid before the outer lid closes, substantially as described.

2. The combination with a syrup-pitcher provided with inner and outer lids, of a guide consisting of a loop mounted on the inner lid and provided at its top with a shoulder, and a link hinged to the outer lid and engaging the guide, substantially as and for the purpose described.

3. The combination with a syrup-pitcher provided with inner and outer lids, of a guide mounted on the inner lid and consisting of a pair of oblong loops bent at their upper sides to form shoulders, and a link hinged to the outer lid and passing through the loops of the guide and provided at its bottom with a weight, substantially as and for the purpose described.

4. The combination of a syrup-pitcher provided with inner and outer lids, a link loosely connecting the lids to cause the inner one to open after the outer lid and close before the same, and means for engaging the link in closing the lids, whereby the inner lid is held firmly closed by the outer lid for cutting off the flow of syrup positively, substantially as described.

5. The combination of a syrup-pitcher, provided with inner and outer lids, and means for loosely connecting the lids to cause the inner lid to open after the outer one and to close before the same, said means comprising a guide mounted on one of the lids, a link connected with the other lid and with the guide, and a stop arranged to be engaged by the link in closing the lids, whereby a positive connection between them is provided, substantially as and for the purpose described.

In testimony that I claim the foregoing as my own I have hereto affixed my signature in the presence of two witnesses.

ELMER G. LANTZ.

Witnesses:
B. A. STAFFORD,
R. B. MONTAGUE.